US012783384B2

(12) United States Patent
Smith et al.

(10) Patent No.: US 12,783,384 B2
(45) Date of Patent: Nov. 3, 2026

(54) SYSTEMS AND METHODS FOR AUTOMATICALLY DETERMINING CODE COMPLIANCE

(71) Applicant: EQUIFAX INC., Atlanta, GA (US)

(72) Inventors: Shaun Smith, Atlanta, GA (US); Leslie Skinner, Cumming, GA (US); Angela Merlette, Alpharetta, GA (US); Maiha Le, Alpharetta, GA (US); Rebecca Flaim, Gainsville, GA (US); Ligia Garro, Escazu (CR)

(73) Assignee: EQUIFAX INC., Atlanta, GA (US)

( * ) Notice: Subject to any disclaimer, the term of this patent is extended or adjusted under 35 U.S.C. 154(b) by 176 days.

(21) Appl. No.: 18/597,505

(22) Filed: Mar. 6, 2024

(65) Prior Publication Data

US 2025/0284613 A1 Sep. 11, 2025

(51) Int. Cl.

| | |
|---|---|
| ***G06F 11/3604*** | (2025.01) |
| ***G06F 8/10*** | (2018.01) |
| ***G06F 8/65*** | (2018.01) |
| ***G06F 8/71*** | (2018.01) |
| ***G06F 8/73*** | (2018.01) |
| ***G06Q 30/018*** | (2023.01) |

(52) U.S. Cl.

CPC ............ *G06F 11/3608* (2013.01); *G06F 8/10* (2013.01); *G06F 8/65* (2013.01); *G06F 8/71* (2013.01); *G06F 8/73* (2013.01); *G06Q 30/018* (2013.01); *G06F 11/3604* (2013.01)

(58) Field of Classification Search

CPC .... G06F 11/3604; G06F 11/3608; G06F 8/65; G06F 8/71; G06Q 30/018

See application file for complete search history.

(56) References Cited

U.S. PATENT DOCUMENTS

| | | | | |
|---|---|---|---|---|
| 10,769,379 | B1 * | 9/2020 | Cougias | G06Q 30/018 |
| 2016/0071113 | A1 * | 3/2016 | Papanicolaou | G06Q 30/018 705/317 |

(Continued)

FOREIGN PATENT DOCUMENTS

| | | | | | |
|---|---|---|---|---|---|
| KR | 100647274 | B1 * | 11/2006 | A21D 13/47 |
| WO | WO-2019113630 | A1 * | 6/2019 | G06F 16/93 |

OTHER PUBLICATIONS

World Best Requirements Management Tools & Software, Aug. 13, 2022, 10 pages, [retrieved on Jan. 21, 26], Retrieved from the Internet: <URL:https://analysttool.com/requirements-management-tools>.*

*Primary Examiner* — Geoffrey R St Leger

(74) *Attorney, Agent, or Firm* — Kilpatrick Townsend & Stockton LLP

(57) ABSTRACT

In some aspects, a compliance computing system can generate an evidence repository including evidence data received via an application programming interface (API) from one or more external systems. The system can receive a compliance request including a compliance query, the compliance query including a requirement identifier associated with a target requirement. The system can also query the evidence repository based on the requirement identifier to retrieve the evidence data associated with the target requirement. Finally, the system can transmit, via a firewall of the compliance computing system, a response message to an external computing system, wherein the response message includes the retrieved evidence data.

14 Claims, 5 Drawing Sheets

300

(56) References Cited

U.S. PATENT DOCUMENTS

| | | | | |
|---|---|---|---|---|
| 2023/0144362 | A1* | 5/2023 | Bates | H04L 63/20<br>726/25 |
| 2024/0061725 | A1* | 2/2024 | Sagar | G06F 9/54 |
| 2025/0139639 | A1* | 5/2025 | Rhodes | G06Q 30/018 |

* cited by examiner

SYSTEMS AND METHODS FOR AUTOMATICALLY DETERMINING CODE COMPLIANCE

TECHNICAL FIELD

This disclosure relates generally to computer-implemented methods and systems for generating a data repository from multiple data sources. More specifically, this disclosure relates to computer-implemented methods and systems for aggregating evidence data related to product or software compliance and determining a compliance status of a product or software based on an automatically updated evidence repository.

BACKGROUND

Various types of computer hardware and software components can be subject to both internal and external requirements. Often, the requirements are defined by different stakeholders with inconsistent formats and varying structure. In large entities, it is difficult to track and enforce requirements affecting a number of products and components, resulting in inefficiencies in tracking and reporting on requirement compliance.

Further, some requirements may define evidence of compliance with the requirement that the entity must provide to a stakeholder. It can be inefficient for an employee managing the product or component associated with the requirement, and who themselves may be unfamiliar with the requirement, to provide evidence of compliance with the requirement at periodic intervals. Additionally, the inconsistency in managing control governance (i.e., enforcement of the requirements) can result in increased labor cost, inefficient reporting, and interruption to existing processes.

SUMMARY

Various embodiments of this disclosure provide systems and methods for compiling an evidence repository and determining a compliance status of a requirement based on data in the evidence repository. In one example, a method that includes one or more processing devices performs operations including generating, by a compliance computing system, an evidence repository including evidence data received via an application programming interface (API) from one or more systems, where the evidence data is associated with one or more requirements. Generating the evidence repository includes receiving the evidence data and evidence metadata and mapping the evidence data to one or more requirements based on the evidence metadata. The method also includes receiving, by a compliance computing system, a compliance request including a compliance query, the compliance query including a requirement identifier associated with a target requirement, querying the evidence repository based on the requirement identifier to retrieve the evidence data associated with the target requirement; and transmitting, via a firewall of the compliance computing system, a response message to an external computing system, wherein the response message includes the retrieved evidence data.

In another example, a system includes a processing device; and a memory device in which instructions executable by the processing device are stored for causing the processing device to perform operations. The operations include generating an evidence repository including evidence data received via an application programming interface (API) from one or more systems, where the evidence data is associated with one or more requirements. Generating the evidence repository includes receiving the evidence data and evidence metadata, and mapping the evidence data to one or more requirements based on the evidence metadata. The operations further include receiving a compliance request including a compliance query, the compliance query including a requirement identifier associated with a target requirement, querying the evidence repository based on the requirement identifier to retrieve the evidence data associated with the target requirement, and transmitting, via a firewall of the compliance computing system, a response message to an external computing system, wherein the response message includes the retrieved evidence data.

In another example, a non-transitory computer-readable storage medium has program code that is executable by a processor device to cause a computing device to perform operations. The operations include generating, by a compliance computing system, an evidence repository including evidence data received via an application programming interface (API) from one or more systems, where the evidence data is associated with one or more requirements. Generating the evidence repository includes receiving the evidence data and evidence metadata, and mapping the evidence data to one or more requirements based on the evidence metadata. The operations further include receiving, by a compliance computing system, a compliance request including a compliance query, the compliance query including a requirement identifier associated with a target requirement, querying the evidence repository based on the requirement identifier to retrieve the evidence data associated with the target requirement, and transmitting, via a firewall of the compliance computing system, a response message to an external computing system, wherein the response message includes the retrieved evidence data.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

BRIEF DESCRIPTION OF THE DRAWINGS

Features, aspects, and advantages of this disclosure are better understood when the following Detailed Description is read with reference to the accompanying drawings.

DETAILED DESCRIPTION

Figure 1:
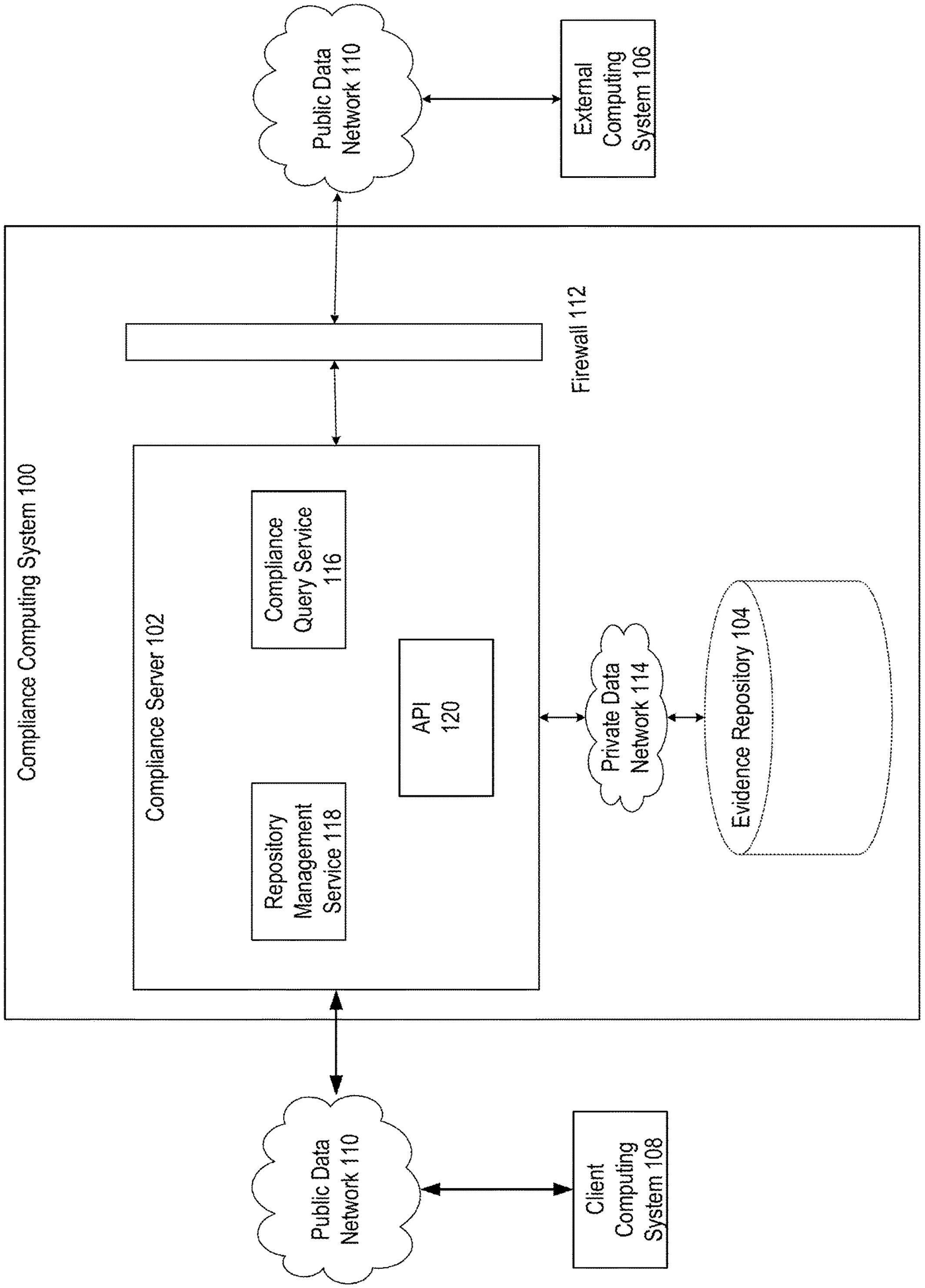
FIG. 1 is a block diagram depicting an example of an operating environment in which a compliance computing system generates an evidence repository, according to certain aspects of this disclosure.

Certain aspects and features of this disclosure involve automatically determining code compliance with a set of requirements. For example, systems and methods described herein can be used to determine a compliance status of a product with one or more requirements based on evidence data stored in an evidence repository. In one aspect, a compliance computing system can maintain an evidence repository containing evidence and requirement data obtained periodically from one or more external systems. In some aspects, the evidence repository can be a firewall-protected cloud-based repository that provides evidence and requirement data to external stakeholders. The evidence repository can automatically update in response to changes in software or hardware data or metadata.

An entity may be subject to product or internal system requirements that may be imposed by a third-party requiring periodic reporting on the entity's compliance with the requirements. Typically, an entity that is subject to requirements (e.g., technical or security requirements) does not have a consistent automated system to manage requirements and evidence required for reporting compliance. This can result in inefficiency, increased cost, and significant delays in producing compliance reports. Further, requirements may be managed by non-technical teams, who are required to interrupt technical teams to obtain appropriate documentation to periodically report compliance with requirements. In some instances, an external body may require evidence of compliance with a requirement from an external computing system, resulting in increased enterprise risk from the external computing system.

To address the above issues, the compliance computing system can service compliance queries using the evidence repository internal to the compliance computing system. The evidence repository can be generated and managed by the compliance computing system. For example, the evidence repository can receive data from one or more external systems or databases and map the received data to particular requirements. The data can be mapped to one or more requirements, thereby creating a searchable repository, allowing a user to search for a particular requirement and view evidence of compliance with the requirement and metadata associated with the requirement.

Using the evidence repository, the compliance computing system can service, in real time, queries from third-party systems. Examples of queries include requests by external entity systems and internal audit systems to verify compliance of a product or system component with one or more requirements and view evidence of the compliance with the requirement. In some aspects, the evidence repository can store evidence and its associated requirement under a unique control identifier. The queries can include the control identifier of the requirements to be investigated. Based on the control identifier, the compliance computing system can service the queries by querying the evidence repository and any external data sources to retrieve evidence of compliance with a requirement.

Querying the evidence repository can include searching records stored in the evidence repository for a match of the control identifier contained in the query. If a match is found, the corresponding record, including compliance evidence, is retrieved. Querying the evidence repository and any external data sources, as well as managing and updating the evidence repository, can be executed by one or more components of the compliance computing system. For example, the compliance computing system can manage one or more cloud-based components to facilitate upload of evidence data to the evidence repository, as well as to manage query execution in a cloud environment.

In some aspects, the compliance computing system can generate a dashboard for display to a user of an external computing system. The dashboard can be displayed as part of a graphical user interface (GUI) and can enable the user to interact with the evidence repository to retrieve evidence associated with a requirement. In some embodiments, the compliance computing system can also determine and display a compliance score indicative of whether the entity is compliant with a requirement and its associated reporting. For example, the requirement data stored by the evidence repository can include a reporting frequency or reporting deadline by which the entity must provide evidence of compliance with a requirement and an indication of a most recent date that a report was generated. The compliance computing system can determine, for example, based on the requirement data that a compliance report for a particular reporting period has not been submitted or that a reporting deadline is approaching. In some aspects, the compliance computing system can determine which requirements the entity is not in compliance with and display, in a dashboard displayed via the GUI, an indication of whether evidence data indicative of compliance exists for each requirement.

In some implementations, the compliance computing system can determine an external computing system's compliance with one or more target requirements. For example, based on analysis of evidence data associated with a requirement, the compliance computing system can determine whether the external computing system is compliant with that requirement. This determination can be used, for example, to control access of the external computing system to a restricted system or resource.

Certain aspects described herein provide improvements to the accuracy and efficiency of determining and reporting compliance with technical requirements. For instance, the disclosed systems and methods enable multiple data sources to be used for searching and verifying compliance, and obtaining evidence of compliance. The system architecture enables the seamless generation of an automatically updating evidence repository. For example, the evidence repository can automatically update evidence data when a connected code repository is updated, thereby ensuring current evidence documentation. This streamlines auditing of requirements and obviates the need for communication between business and engineering teams to identify and locate data indicating compliance with a requirement. Further, the evidence data can be mapped to requirements for which it proves compliance, which enables efficient searching of the evidence repository and simple generation of compliance reports.

As a result, the accuracy and efficiency of compliance reporting can be increased. For example, the automatically updating evidence repository can maintain current compliance evidence and can be queried by both internal and external systems to provide auditing and reporting functionality. Further, the evidence repository can be stored behind a firewall and can be access-restricted, such that evidence of compliance is protected and read permissions across types of users can be managed.

These illustrative examples are given to introduce the reader to the general subject matter discussed here and are not intended to limit the scope of the disclosed concepts. The following sections describe various features and examples with reference to the drawings, in which like numerals indicate like elements, but, like the illustrative examples, should not be used to limit this disclosure.

Operating Environment Example for a Compliance Computing System

Referring now to the drawings, FIG. 1 is a block diagram depicting an example of an operating environment in which a compliance server 102 generates and manages an evidence repository 104 and uses the evidence repository 104 to service compliance queries from external computing systems 106. FIG. 1 depicts examples of components of a compliance computing system 100, according to some aspects. The compliance computing system 100 is a specialized computing system that may be used for processing large amounts of data using a large number of computer processing cycles. In some aspects, the compliance computing system 100 can be hosted in whole or partially in a cloud computing environment.

The numbers of devices depicted in FIG. 1 are provided for illustrative purposes. Different numbers of devices may be used. For example, while certain devices or systems are shown as single devices in FIG. 1, multiple devices may instead be used to implement these devices or systems. More components, fewer components, or a different arrangement of the components shown in FIG. 1 may be included in other examples. Any suitable arrangement of the depicted components is contemplated herein.

The compliance computing system 100 can communicate with one or more systems, including external computing systems 106, client computing systems 108 (e.g., computing systems internal to the entity managing the compliance computing system 100), or some combination thereof. The client computing systems 108 can include user computing systems that are associated with a user. For example, client systems may send data to the compliance server 102 to be processed or may send signals to the compliance server 102 that control or otherwise influence different aspects of the compliance computing system 100 or the data it is processing. The client computing systems 108 may interact, via one or more public data networks 110, with the compliance computing system 100 to provide evidence data or manage various configurations of the evidence repository 104.

Each external computing system 106 may include one or more third-party devices, such as individual servers or groups of servers operating in a distributed manner. An external computing system 106 can include any computing device or group of computing devices operated by, for example, an audit system, a third-party regulatory body, a third-party auditing service, etc. The external computing systems 106 can generate and transmit compliance queries to the compliance server 102 for execution to retrieve evidence and requirement data from the evidence repository 104.

Each external computing system 106 can interact with the compliance server 102 to query the evidence repository 104 via a firewall 112. The firewall device 112, may couple the compliance server 102 to one or more computing devices of the external computing system 106 to form a private data network 114. The firewall device 112, which can include one or more devices, creates a secured part of the compliance computing system 100 that includes various devices in communication via the private data network 114. In some aspects, by using the private data network 114, the compliance computing system 100 can house the evidence repository 104 in an isolated network (i.e., the private data network 114) that has no direct accessibility via the Internet or another public data network 110. Thus, proprietary evidence stored in the evidence repository 104 is subject to an additional layer of protection.

Each communication within the compliance computing system 100 (e.g., between external computing systems 106 and the compliance computing system 100, and between client computing systems 108 and the compliance computing systems 100) may occur over one or more data networks, such as a public data network 110, a private data network 114, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface (e.g., IEEE 802.11 or Bluetooth) or a combination of wireless interfaces. A wired network may include a wired interface (e.g., Ethernet, USB, IEEE 1394, or a fiber optic interface). The wired or wireless networks may be implemented using routers, access points, bridges, gateways, or the like, to connect devices in the data network.

A data network may include network computers, sensors, databases, or other devices that may transmit or otherwise provide data to compliance computing system 100. For example, a data network may include local area network devices, such as routers, hubs, switches, or other computer networking devices. The data networks depicted in FIG. 1 can be incorporated entirely within (or can include) an intranet, an extranet, or a combination thereof. In one example, communications between two or more systems or devices can be achieved by a secure communications protocol, such as secure Hypertext Transfer Protocol ("HTTPS") communications that use secure sockets layer ("SSL") or transport layer security ("TLS"). In addition, data or transactional details communicated among the various computing devices may be encrypted. For example, data may be encrypted in transit and at rest.

The compliance computing system 100 can include one or more compliance servers 102. The compliance server 102 may be a specialized computer or other machine that processes the data received within the compliance computing system 100. The compliance server 102 may include one or more other systems. For example, the compliance server 102 may include a database system for accessing a network-attached or on-prem storage unit, a cloud computing system, or both. A cloud computing system can include cloud-based data storage and processing functionality.

In some aspects, the compliance server 102 can allow the compliance computing system 100 to be an interface between various external computing systems 106 and various client computing systems 108. This architecture can facilitate the real-time maintenance of the evidence repository 104 by the compliance server 102 or client computing systems 108, and can enable management and execution of compliance queries received from the external computing system 106.

For example, the compliance server 102 can include one or more processing devices that execute program code, such as a compliance query service 116, a repository management service 118, and an application programming interface (API) 120. The program code is stored on a non-transitory computer-readable medium. The processing devices can execute one or more processes for generating and managing the evidence repository 104 and for executing and managing queries of the evidence repository 104.

The API 120 can receive or retrieve evidence data indicative of compliance with one or more requirements stored in the evidence repository 104. For example, the API 120 can enable a client computing system 108 to push a most recent version of source code, or a source code snippet, to the compliance server 102 for storage in the evidence repository 104. In some embodiments, the API 120 can periodically pull the most recent versions of code from one or more code repositories. In another aspect, the API 120 can receive metadata associated with one or more hardware components of a system (e.g., processors, storage devices, network interfaces). The metadata can include, for example, a version number, serial number, operating system, or other technical specifications of the component. The metadata can also include information such as a date of the most recent software or firmware update on the component. The API 120 can also receive documentation of technical processes or specifications.

Evidence data received by the API 120 can be formatted into a standardized data structure. For example, a requirement can be assigned a unique control identifier that can be used to look up the requirement. The compliance server 102 can receive the evidence data via the API 120 and map the evidence data to a requirement. Thus, a user can then query the evidence repository 104 using the control identifier to look up a particular requirement and retrieve the associated evidence data. In some aspects, evidence data can be mapped to a particular requirement or a particular product. For example, evidence data that a particular product complies with external requirements can be mapped to the requirements based on its association with the particular product. When the evidence data is received by the compliance server 102, the evidence data itself or its associated metadata can be used to map the evidence data to a requirement. For example, metadata indicating a product identifier can be used to map the evidence data to requirements stored in the evidence repository 104 and associated with the product identifier.

The repository management service 118 can enable an internal user of the client computing system 108 to manage the evidence repository 104. For example, the repository management service 118 can receive input from the internal user that is indicative of an interval at which to check any external data sources (e.g., an external code repository) for new versions of evidence (e.g., new versions of code). In some embodiments, the repository management service 118 can periodically run an update of the evidence repository 104 such that the evidence data in the evidence repository 104 is fresh when a query is run. In other aspects, the repository management service 118 can check for updates or new versions each time a compliance query is requested, prior to the compliance server 102 executing the query.

The evidence data stored in the evidence repository 104 can be any information indicative of an entity's compliance with a requirement. For example, a requirement may indicate a particular level of security for a particular system of the entity. Evidence data of this requirement can be code snippets or program files of code for implementing the required level of security. In another aspect, evidence data can be product data indicating a version of an off-the-shelf security system run on the particular system of the entity. In yet another aspect, evidence data can be internally published documentation or checklists that are completed at periodic intervals or in response to a trigger event. The evidence data can be structured data. In some aspects, where the evidence is documentation, the evidence data can point to a storage location of the evidence data (e.g., a link to the location of the documentation in a database).

The compliance query service 116 can receive and execute queries from the external computing systems 106. For example, the compliance query service 106 can be communicatively coupled to the external computing systems via the firewall 112. The compliance query service 116 can receive a compliance query indicating a control identifier, a requirement identifier, a product identifier, or a combination thereof on which to query the evidence repository 104. The compliance query service 116 can manage execution of the compliance query including, for example, load balancing, throughput, and cloud computing resources required to retrieve the evidence data from the evidence repository 104. In some aspects, the compliance query can be a structured query (e.g., a SQL query). In other aspects, the compliance query can be a structured query generated by a user using a query generation GUI. For example, the user can select one or more identifiers from one or more drop-down lists of products, requirements, governing documents, control identifiers, evidence sources, and the like.

In some aspects, the compliance computing system 100 can be in communication with an authentication server. The authentication server can authenticate a user of the external computing system 106 prior to granting the user access to the evidence repository 104. In some examples, the repository management service 118 can manage permissions of users with respect to the evidence repository 104. Thus, certain users may not have access to all stored evidence data. As an example, a set of evidence data including a code snippet can be subject to trade secret protections. The repository management service 118 can set a permission level of a particular user such that when the user is authenticated, the particular user is not granted access to the protected code snippet. In another example, the authentication server or the repository management service 118 can indicate whether a user has suitable qualifications to handle certain evidence data in accordance with legal or regulatory requirements.

In some aspects, the compliance computing system 100 can implement one or more procedures to secure communications between the compliance computing system 100 and other systems (e.g., the client computing system 108 and the external computing system 106). Non-limiting examples of features provided to protect data and transmissions between the compliance computing system 100 and other systems include secure web pages, encryption, firewall protection, network behavior analysis, intrusion detection, etc. In some aspects, transmissions with other systems can be encrypted using public key cryptography algorithms using a minimum key size of 128 bits. In additional or alternative aspects, website pages or other data can be delivered through HTTPS, secure file-transfer protocol ("SFTP"), or other secure server communications protocols. In additional or alternative aspects, electronic communications can be transmitted using Secure Sockets Layer ("SSL") technology or other suitable secure protocols. Extended Validation SSL certificates can be utilized to clearly identify a website's organization identity. In another non-limiting example, physical, electronic, and procedural measures can be utilized to safeguard data from unauthorized access and disclosure.

Figure 2:
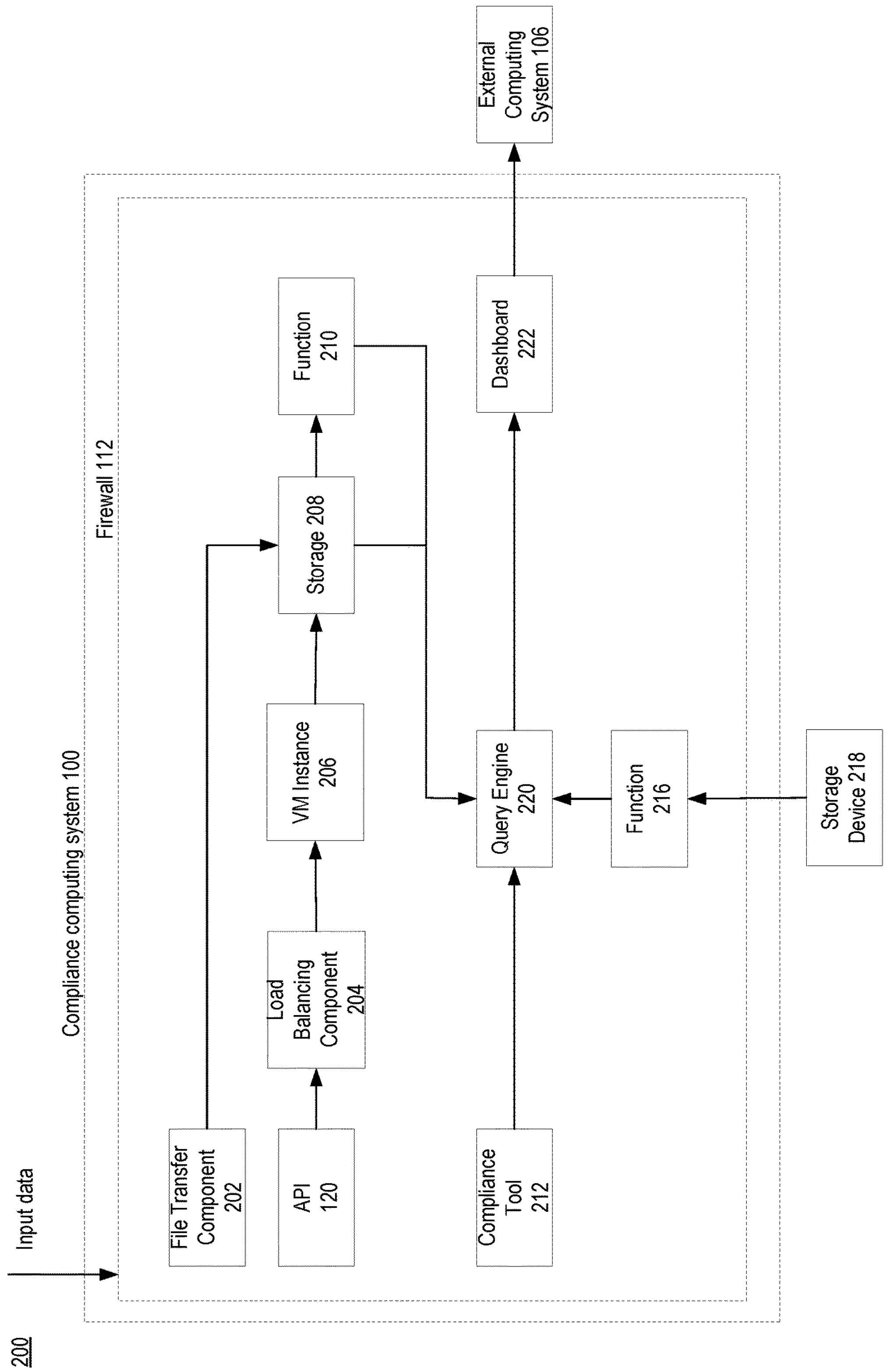
FIG. 2 is a block diagram depicting an example system for determining a compliance status of a requirement by a compliance computing system, according to certain aspects of this disclosure.

FIG. 2 is a block diagram of a system 200 for real-time servicing compliance queries submitted by an external computing system 106. The system 200 can involve one or more of the computing devices depicted in FIG. 1 and can include any examples of processes described herein, but other implementations are possible. In some aspects, the components or functionality of the components in FIG. 2 may be implemented in program code that is executed by one or more computing devices such as the compliance server 102 depicted in FIG. 1. In some aspects of this disclosure, one or more components shown in FIG. 2 may be omitted or arranged in a different order. Similarly, additional components not shown in FIG. 2 may be included. The components of system 200 can be cloud-based components deployed in a cloud environment.

In some aspects, system 200 can include a file transfer component 202. The file transfer component 202 can provide a GUI (e.g., a GUI displayed on the client computing system 108) through which a user can manually upload files. The file transfer component 202 can, for example, handle manual data and file transfer from a client computing system 108 to the compliance computing system 100. The file transfer component 202 can handle multiple formats of files or data across multiple file transfer protocols. The data or files received via the file transfer component 202 can be from internal or external data sources (e.g., a GitHub™ repository).

Data or files can additionally be ingested by the compliance computing system 100 via the API 120 discussed above. In some aspects, evidence data can be pushed to the API 120. For example, the API 120 can receive evidence data from a client computing system 108 when new evidence data is generated or when evidence data currently stored in the evidence repository 104 is updated or modified. In some aspects, the API 120 automatically uploads evidence files at predetermined intervals or when evidence data is updated or modified in the evidence repository 104. In some aspects, the compliance computing system 100 can periodically monitor evidence data sources (e.g., code repositories) to periodically pull evidence data from the most recent versions of stored code.

In some aspects, the compliance computing system 100 can store evidence templates. An evidence template can define a format for a file containing evidence data associated with a requirement. The template can require particular documentation and formatting standards, enabling easier interpretation by users across internal and external entities and accurate parsing of uploaded evidence files by the compliance computing system 100.

In some aspects, the API 120 can be used to load data into the evidence repository 104 using a load balancing component 204 to manage the data transfer and throughput through a virtual machine (VM) instance 206. The VM instance 206 can manage autoscaling and, in some cases, load balancing of the data transfer via the API 120. In some aspects, the system 200 can include a collection of VM instances, such as a managed instance group (MIG) to handle data transfer workloads. Accordingly, the VM instance 206 and the load balancing component 204 can function in concert to facilitate efficient data transfer within the limits of the cloud computing environment of the compliance computing system 100.

The system 200 can include storage 208. The storage 208 can be, for example, cloud-based storage that stores evidence data in folders that may be references by the evidence repository 104. The storage 208 can facilitate and handle query jobs to the evidence repository 104. The connector 208 can be communicatively coupled to the evidence repository 104 and can index the data stored by the evidence repository 104 such that the data is searchable by the compliance server 102. In some aspects, the system 200 can include a serverless function 210 for managing events and orchestrating messaging between the storage 208 and the query engine 220.

In some aspects, system 200 can include compliance tool 212 The compliance tool 212 can, for example, perform security checks and can collect the results of those checks as well as evidence associated with the checks. The security check results and associated evidence data may be stored in the evidence repository 104.

The system 200 can include storage 208. The storage 208 can be, for example, cloud-based storage that stores evidence data in folders that may be references by the evidence repository 104. The storage 208 can facilitate and handle query jobs to the evidence repository 104. The storage 208 can be communicatively coupled to the evidence repository 104 and can index the data stored by the evidence repository 104 such that the data is searchable by the compliance server 102. In some aspects, the system 200 can include a serverless function 210 for managing events and orchestrating messaging between the storage 208 and the query engine 220.

Accordingly, the components of system 200 can facilitate real-time querying of the evidence repository 104 in a cloud environment. Components of the system 200 can enable efficient querying of the evidence repository 104, for example, by handling load balancing and throughput while retrieving large amounts of evidence data.

For example, a user of the external computing system 106 can interact with a query engine 220 to write (or build) and execute compliance queries. A compliance query can be a query to retrieve evidence data indicative of compliance of the entity with a particular requirement. The user can write a query that returns evidence data associated with a particular product or requirement. For example, the compliance query can retrieve all requirements and associated evidence data for a particular product based on a product identifier. In another example, the compliance query can retrieve evidence data associated with a particular requirement. In yet another example, a user can execute a query to return metadata associated with a requirement, such as a requirement source, requirement definition, reporting instructions, reporting frequency, responsible party, and the like. Thus, via the query engine 220, the user can explore evidence and requirement data associated with the entity and its products.

In some aspects, the results of a compliance query can be analyzed and displayed via a user-facing dashboard 222. The dashboard 222 can be displayed to the user via a display or interface of the external computing system 106. The dashboard 222 can include the retrieved evidence data (e.g., code snippets, file locations, documentation, etc.) as well as requirement metadata. In some aspects the compliance computing system 100 can analyze the evidence data (e.g., using a machine learning model or language processing model) to determine whether the evidence data satisfies the requirement definition. If the evidence data satisfies the requirement, the dashboard 222 can provide an indication of compliance with the requirement. Accordingly, the dashboard 222 can be used to display compliance information and evidence data associated with a single requirement, or with a set of requirements (e.g., a set of requirements associated with a product or system).

In some aspects, the dashboard 222 can display a compliance status indicating whether the entity is in compliance with requirements or if a compliance report to a third-party is overdue. For example, the compliance computing system 100 can determine which requirements the entity is not in compliance with and display, via the dashboard 222, an indication of whether evidence data indicative of compliance exists for each requirement.

Figure 3:
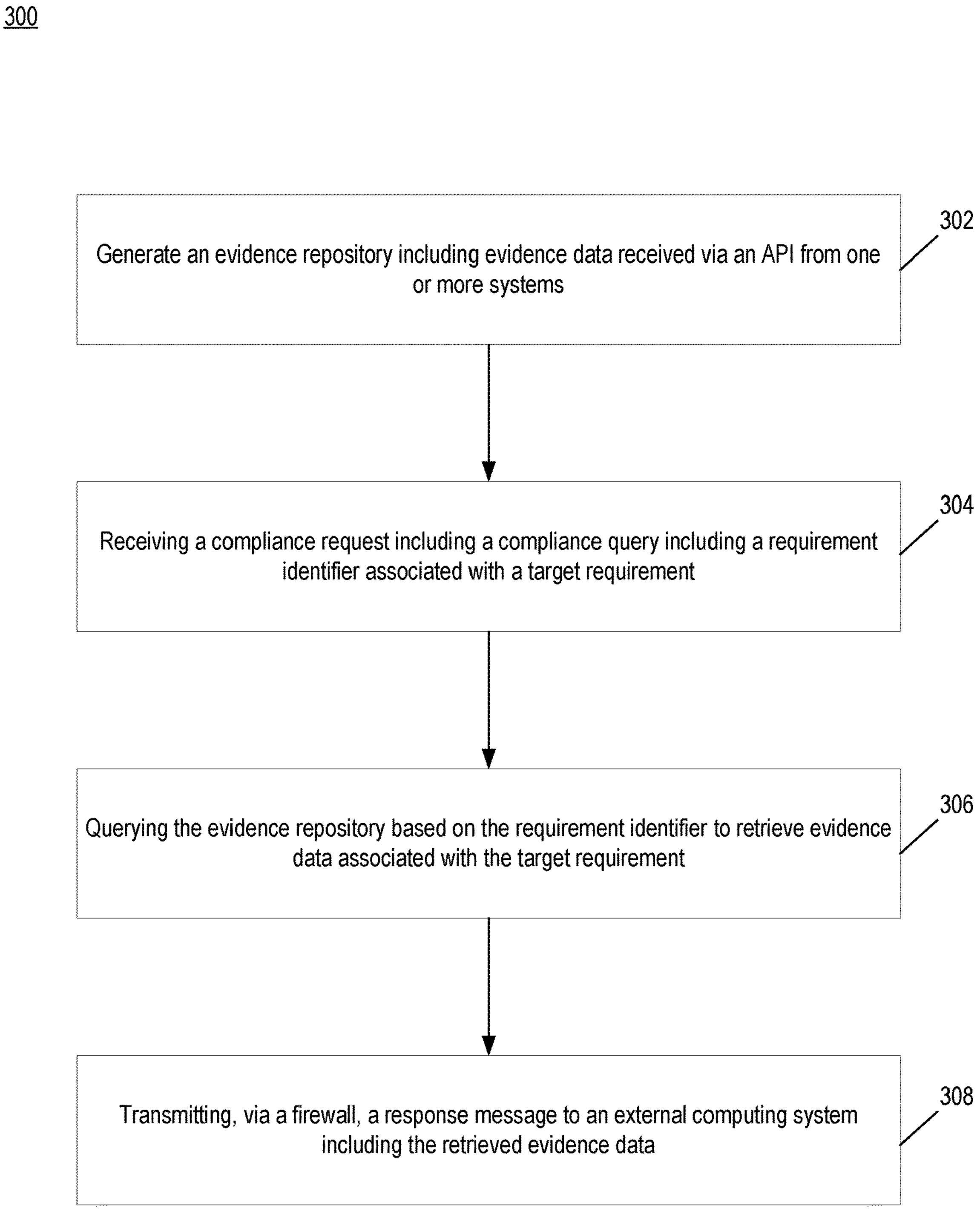
FIG. 3 is a flow chart depicting an example of a process for determining a compliance status of a requirement by a compliance computing system, according to certain aspects of this disclosure.

FIG. 3 is a flow chart depicting an example of a process 300 for generating an evidence repository and querying the evidence repository to determine a compliance status of a requirement. The process 300 can involve one or more of the computing devices depicted in FIGS. 1 and 2, and can include any examples of processes described herein, but other implementations are possible. In some aspects, the steps in FIG. 3 may be implemented in program code that is executed by one or more computing devices such as the compliance server 102 depicted in FIG. 1, or by one or more components of system 200 depicted in FIG. 2. In some aspects of this disclosure, one or more operations shown in FIG. 3 may be omitted or performed in a different order. Similarly, additional operations not shown in FIG. 3 may be performed.

At block 302, the process 300 involves generating, by a compliance computing system, an evidence repository including evidence data received via an API from one or more systems. For example, the compliance computing system 100 can receive evidence data from one or more systems via the API 120 and store the evidence data in the evidence repository 104. Evidence data can, in some aspects, be manually uploaded using the GUI generated by the file transfer component 202. In some aspects, the evidence data can be associated with one or more requirements. In some examples, the one or more requirements can be received from a third-party entity and can be stored in a requirement database. The requirement database can also store requirement metadata such as, for example, a contract from which the requirement arises, a product associated with the requirement, reporting frequency, and the like. In some aspects the evidence repository is a cloud-based database or hybrid database.

In some aspects, generating the evidence repository can include receiving evidence data and evidence metadata, and mapping the evidence data to one or more requirements based on the evidence metadata matching requirement metadata of a requirement of the one or more requirements. For example, evidence metadata associated with evidence data can indicate that the evidence data is stored in a code repository at a location associated with a particular product. Thus, the evidence metadata indicating the product can be used to map the evidence data to one or more requirements associated with that product based on the requirement metadata. In another example, evidence metadata can indicate that evidence data is associated with a particular contract. The evidence data can be mapped to one or more requirements arising from and defined by that contract based on the requirement metadata of the requirements.

At block 304, the process 300 involves receiving a compliance request including a compliance query including a requirement identifier associated with a target requirement. For example, the compliance computing system 100 can receive, from an external computing system 106, a compliance request to view evidence data indicative of the entity's compliance with a target requirement. The compliance query can be a structured query indicating a requirement identifier of the target requirement. In some aspects, the requirement identifier can be a primary key of the evidence repository. In some aspects, the compliance query can be received and handled by the query engine 220 of the compliance computing system 100. The query engine 220 can, in some cases, execute the query using a connector to enable the external computing system 106 to read data from the evidence repository 104.

At block 306, the process 300 can include querying the evidence repository based on the requirement identifier to retrieve evidence data associated with the target requirement. For example, the query engine 220 can query the evidence database 104 on the requirement identifier to retrieve records containing evidence data associated with the target requirement. In some aspects, querying the evidence repository 104 can include load balancing and autoscaling to manage the data transfer of retrieved data, e.g., using the load balancing component 204 and an autoscaling VM instance 206, respectively.

In some aspects, executing the compliance query can also include querying an external database (e.g., storage device 218). For example, via the firewall, the query engine 220 can execute the compliance query on a third-party, versioned code repository storing code that is evidence data. For example, a code file in the repository can be evidence that a product of the entity is compliance with a target requirement. In some aspects, the compliance computing system 100 can monitor the versioned code repository for updates (e.g., updates to version numbers) or can periodically update. For example, the compliance computing system 100 can determine that a newer version of a code file has been saved or pushed to a production environment. The compliance computing system 100 can retrieve the updated code file from the repository and store the updated code file, or a pointer or link to the updated code file, in the evidence repository 104, thereby replacing the previous version of the code file or the reference to the previous version of the code file. Thus, the evidence repository 104 can maintain a most recent version of evidence data without the need for human intervention to continually upload evidence data each time a source document containing the evidence data is modified.

At block 308, the process 300 can include transmitting, via a firewall, a response message to an external computing system including the retrieved evidence data. For example, the compliance computing system 100 can transmit the query results to the external computing system 106. In some aspects, the compliance computing system 100 can host a dashboard 222 accessible to the external computing system 106. In other aspects, the compliance computing system 100 can generate executable instructions that are transmitted to the external computing system 106 and cause the external computing system to display a dashboard of the retrieved evidence data. In some aspects, the compliance computing system 100 encrypts the response message prior to transmitting the response message to the external computing system 106.

In some implementations, the compliance computing system 100 can determine a compliance status associated with the target requirement. For example, the compliance computing system 100 can retrieve the associated evidence data and analyze the evidence data to determine whether the target requirement is met. For example, the compliance computing system 100 can determine whether the external computing system 106 is compliant or non-compliant with the target requirement based on a comparison of the evidence data with the target requirement or by analyzing the evidence data. In some aspects, analyzing the evidence data can include comparing the evidence data with stored requirement criteria or compliance criteria associated with the requirement. If the evidence data meets the criteria or matches the criteria above a predetermined threshold, the compliance status can indicate that the requirement is satisfied. In other examples, the compliance computing system 100 can use language processing or a machine-learning model to analyze or parse the evidence data to identify whether the evidence data satisfies the requirement above a particular threshold.

In some aspects, the response message can include executable code for restricting access of the external computing system 106 to one or more secured resources. For example, the response message, or a separately transmitted message (e.g., to a restricted system or resource) can deny or restrict access of the external computing system 106 to the restricted system or resource. In one implementation, the compliance computing system 100, in response to a determination that the external computing system 106 is not compliant with a target restriction, can generate and transmit a message to a restricted server. The message can include an indication of the compliance status of the external computing system 106 or executable code that causes the restricted server to deny access of the external computing system 106 to an interactive computing environment associated with the restricted server.

Example of a Compliance Dashboard

Figure 4:
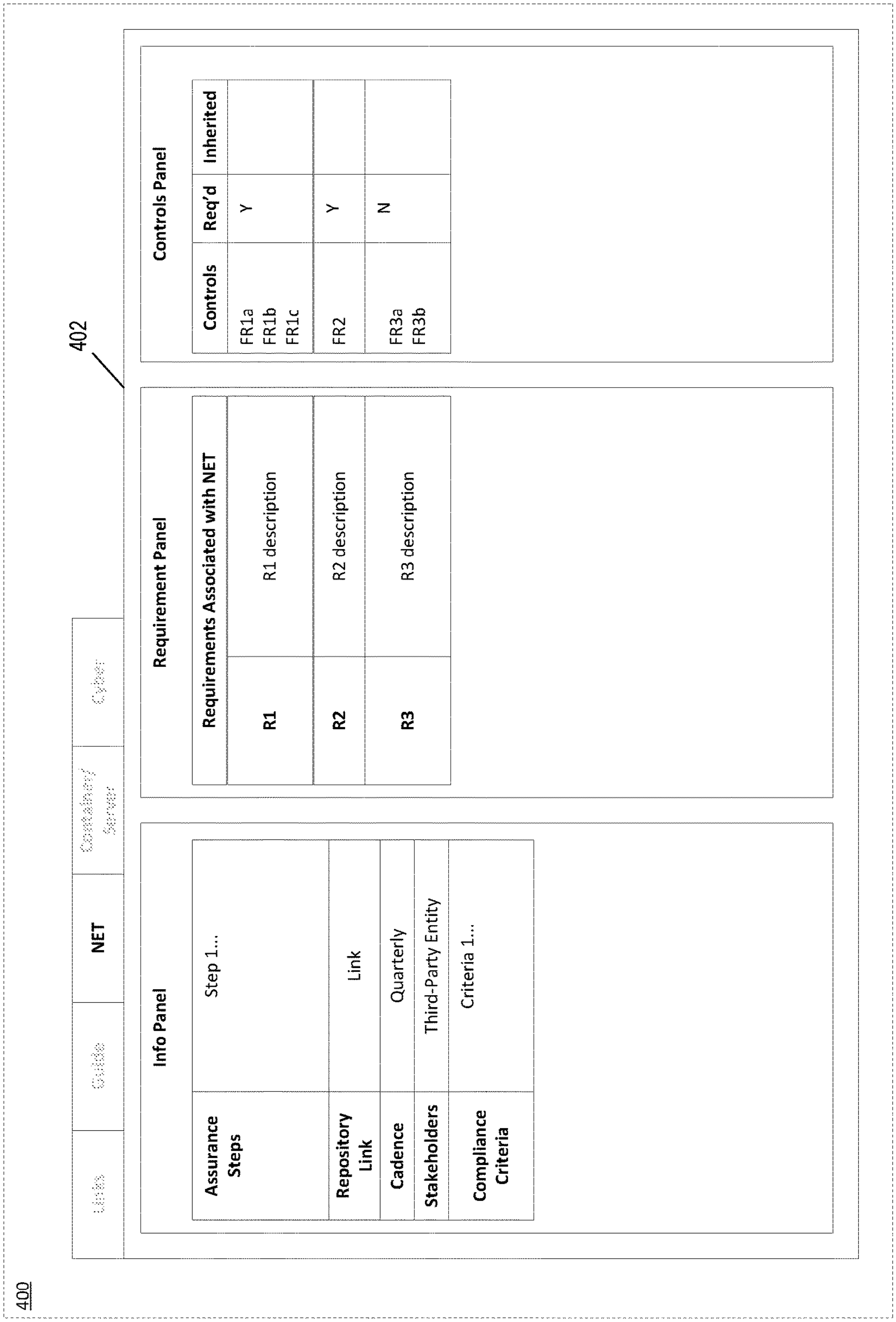
FIG. 4 is an exemplary graphical user interface (GUI) for viewing data retrieved from an evidence repository, according to certain aspects of this disclosure.

FIG. 4 is an illustration of an exemplary GUI 400 displaying a compliance dashboard 402, in accordance with the present disclosure. In some examples, the compliance dashboard 402 can be generated in response to a compliance request from an external computing system 106. In another example, the dashboard 402 can enable a user of the external computing system 106 to explore the evidence data stored in the evidence repository 104 by requirement or product. In other examples, the user can view requirements by contract or governing document.

As an example, dashboard 402 can display requirement information and requirement metadata associated with a network product. The dashboard 402 can display requirement metadata in an "Info Panel." The requirement metadata can include assurance steps (e.g., reporting requirements), a link to the evidence data in the evidence repository 104, a cadence at which compliance with the requirement is to be reported, stakeholders, and criteria to establish compliance.

The dashboard 402 can also display a "Requirement Panel" listing the requirements associated with the product and the description of each requirement. The description may include technical specifications or other information defining the requirement. The dashboard 402 can also display a "Controls Panel" including a list of controls associated with each requirement, whether the control is required to be implemented, and an inherited status. In some aspects, inherited status can refer to whether the requirement is associated with a system provided by a third-party provider. For example, the control can be inherited from the third-party provider system.

Accordingly, by navigating to tabs associated with different controls, a user can view and explore the requirement information associated with each control. Further, by navigating to the repository link, the user can access and view evidence of the control's compliance with the associated requirements. Navigating to the various tabs of the dashboard 402 can cause the compliance computing system 100 to automatically execute a query on the evidence repository for the respective control, thereby retrieving the requirement information and repository link to provide via the dashboard 402.

By interacting with the dashboard 402, to execute compliance queries and explore requirement and evidence data, the compliance computing system eliminates inefficiencies and redundancies associated with traditional audits in which business teams must interact with and interrupt engineering teams and their workstreams. This enables both internal and external users to view evidence data within the particular permissions granted to each user, thereby facilitating use of the compliance computing system 100, while ensuring data security.

The dashboard 402 enables a user to review and explore controls and their associated requirements. The compliance computing system 100 can, for example, manage and track the requirements and compliance of s number of systems (e.g., thousands of systems). The dashboard 402 enables a user to view controls, requirements, and evidence of compliance with the requirements in a single platform, thereby providing visibility into an entity's compliance with the requirements across systems. Further, the evidence repository 104 can ensure that evidence retention requirements are met by the entity, such that the evidence of compliance with a requirement can be viewed via the dashboard 402.

Example of Computing System for a Compliance Service

Figure 5:
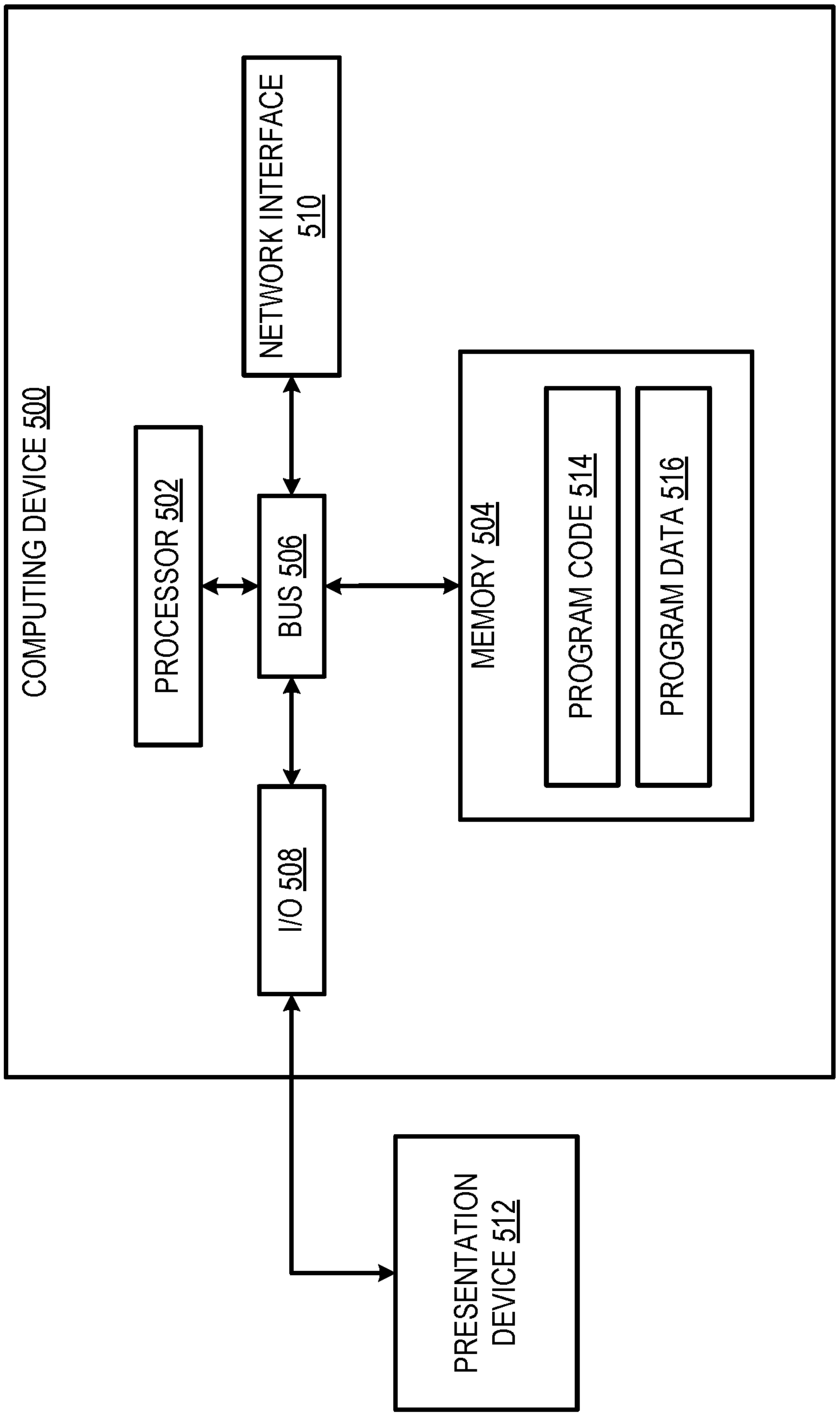
FIG. 5 is a block diagram depicting an example of a computing system suitable for implementing aspects of the techniques and technologies presented herein.

Any suitable computing system or group of computing systems can be used to perform the operations described herein. For example, FIG. 5 is a block diagram depicting an example of a computing device 500, which can be used to implement the compliance server 102 described with respect to FIG. 1. The computing device 500 can include various devices for communicating with other devices in the compliance computing system 100, as described with respect to FIG. 1. The computing device 500 can include various devices for performing one or more operations described above with respect to FIGS. 1-4.

The computing device 500 can include a processor 502 that is communicatively coupled to a memory 504. In some aspects, the processor 502 can be referred to as a "processor device". The processor 502 executes computer-executable program code stored in the memory 504, accesses information stored in the memory 504, or both. Program code 514 may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 502 include a microprocessor, an application-specific integrated circuit, a field-programmable gate array, or any other suitable processing device. The processor 502 can include any number of processing devices, including one. The processor 502 can include or communicate with a memory 504. The memory 504 stores program code that, when executed by the processor 502, causes the processor to perform the operations described in this disclosure.

The memory 504 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language include Hadoop, C, C++, C#, Visual Basic, Java, Python, Perl, JavaScript, ActionScript, etc.

The computing device 500 may also include a number of external or internal devices such as input or output devices. For example, the computing device 500 is shown with an input/output interface 508 that can receive input from input devices or provide output to output devices. A bus 506 can also be included in the computing device 500. The bus 506 can communicatively couple one or more components of the computing device 500.

The computing device 500 can execute program code 514. The program code 514 may be resident in any suitable computer-readable medium and may be executed on any suitable processing device. For example, as depicted in FIG. 5, the program code 514 can reside in the memory 504 along with the program data 516 associated with the program code 514. Executing program code 514 can cause the processor 502 to perform the operations described herein.

In some aspects, the computing device 500 can include one or more output devices. One example of an output device is the network interface device 510 depicted in FIG. 5. A network interface device 510 can include any device or group of devices suitable for establishing a wired or wireless data connection to one or more data networks described herein. Non-limiting examples of the network interface device 510 include an Ethernet network adapter, a modem, etc.

Another example of an output device is the presentation device 512 depicted in FIG. 5. A presentation device 512 can include any device or group of devices suitable for providing visual, auditory, or other suitable sensory output. Non-limiting examples of the presentation device 512 include a touchscreen, a monitor, a speaker, a separate mobile computing device, etc. In some aspects, the presentation device 512 can include a remote client-computing device that communicates with the computing device 500 using one or more data networks described herein. In other aspects, the presentation device 512 can be omitted.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

What is claimed is:

1. A method that includes one or more processing devices performing operations comprising:

generating, by a compliance computing system, an evidence repository comprising evidence data received via an application programming interface (API) from one or more systems, wherein the evidence data is associated with one or more requirements and wherein generating the evidence repository comprises:

receiving the evidence data and evidence metadata; and mapping the evidence data to one or more requirements based on the evidence metadata;

receiving, by the compliance computing system, a compliance request comprising a compliance query, the compliance query comprising a requirement identifier associated with a target requirement;

querying the evidence repository based on the requirement identifier to retrieve the evidence data associated with the target requirement;

querying, via a firewall of the compliance computing system, a database external to the compliance computing system;

determining, by the compliance computing system, that a version of a code file has been updated;

retrieving the updated code file from the database external to the compliance computing system;

storing the updated code file in the evidence repository thereby replacing a previous version of the code file; and transmitting, via the firewall, a response message to an external computing system, wherein the response message comprises the retrieved evidence data.

2. The method of claim 1, wherein the evidence repository is a cloud-based data repository in communication with a storage device configured to index the evidence data in the evidence repository.

3. The method of claim 2, wherein querying the evidence repository further comprises:

receiving the compliance query from the external computing system at a query engine of the compliance computing system; and executing the compliance query on the evidence repository using the storage device configured to enable the external computing system to read data from the evidence repository.

4. The method of claim 1, further comprising:

encrypting, by the compliance computing system, the response message prior to transmitting the response message to the external computing system via the firewall.

5. The method of claim 1, further comprising:

determining that the external computing system is non-compliant with the target requirement based on a comparison of the evidence data with the target requirement; and restricting access of the external computing system to an interactive computing environment based on the determination.

6. A compliance computing system comprising:

a processing device; and a memory device in which instructions executable by the processing device are stored for causing the processing device to perform operations comprising:

generating an evidence repository comprising evidence data received via an application programming interface (API) from one or more systems, wherein the evidence data is associated with one or more requirements and wherein generating the evidence repository comprises:

receiving the evidence data and evidence metadata; and mapping the evidence data to one or more requirements based on the evidence metadata;

receiving a compliance request comprising a compliance query, the compliance query comprising a requirement identifier associated with a target requirement;

querying the evidence repository based on the requirement identifier to retrieve the evidence data associated with the target requirement;

querying, via a firewall of the compliance computing system, a database external to the compliance computing system;

determining, by the compliance computing system, that a version of a code file has been updated;

retrieving the updated code file from the database external to the compliance computing system;

storing the updated code file in the evidence repository thereby replacing a previous version of the code file; and transmitting, via the firewall, a response message to an external computing system, wherein the response message comprises the retrieved evidence data.

7. The system of claim 6, wherein the evidence repository is a cloud-based data repository in communication with a storage device configured to index the evidence data in the evidence repository.

8. The system of claim 7, wherein querying the evidence repository further comprises:

receiving the compliance query from the external computing system at a query engine of the compliance computing system; and executing the compliance query on the evidence repository using the storage device configured to enable the external computing system to read data from the evidence repository.

9. The system of claim 6, wherein the operations further comprise:

encrypting, by the compliance computing system, the response message prior to transmitting the response message to the external computing system via the firewall.

10. The system of claim 6, wherein the operations further comprise:

determining that the external computing system is non-compliant with the target requirement based on a comparison of the evidence data with the target requirement; and restricting access of the external computing system to an interactive computing environment based on the determination.

11. A non-transitory computer-readable storage medium having program code that is executable by a processor device to cause a computing device to perform operations, the operations comprising:

generating, by a compliance computing system, an evidence repository comprising evidence data received via an application programming interface (API) from one or more systems, wherein the evidence data is associated with one or more requirements and wherein generating the evidence repository comprises:

receiving the evidence data and evidence metadata; and mapping the evidence data to one or more requirements based on the evidence metadata;

receiving, by the compliance computing system, a compliance request comprising a compliance query, the compliance query comprising a requirement identifier associated with a target requirement;

querying the evidence repository based on the requirement identifier to retrieve the evidence data associated with the target requirement;

querying, via a firewall of the compliance computing system, a database external to the compliance computing system;

determining, by the compliance computing system, that a version of a code file has been updated;

retrieving the updated code file from the database external to the compliance computing system;

storing the updated code file in the evidence repository thereby replacing a previous version of the code file; and transmitting, via the firewall, a response message to an external computing system, wherein the response message comprises the retrieved evidence data.

12. The non-transitory computer-readable storage medium of claim 11, wherein the evidence repository is a cloud-based data repository in communication with a storage device configured to index the evidence data in the evidence repository.

13. The non-transitory computer-readable storage medium of claim 12, wherein querying the evidence repository further comprises:

receiving the compliance query from the external computing system at a query engine of the compliance computing system; and executing the compliance query on the evidence repository using a storage device configured to enable the external computing system to read data from the cloud-based data repository.

14. The non-transitory computer-readable storage medium of claim 11, wherein the operations further comprise:

encrypting, by the compliance computing system, the response message prior to transmitting the response message to the external computing system via the firewall.

* * * * *